United States Patent [19]

Shigehiro et al.

[11] Patent Number: 4,528,306

[45] Date of Patent: Jul. 9, 1985

[54] SOFT VINYL CHLORIDE RESIN COMPOSITION

[75] Inventors: Koga Shigehiro; Kanazawa Yoshihisa; Okamoto Takeshi; Yamanouchi Masafumi; Shudo Kazumichi, all of Ichiharashi, Japan

[73] Assignee: Chisso Corporation, Osaka, Japan

[21] Appl. No.: 602,336

[22] Filed: Apr. 20, 1984

[30] Foreign Application Priority Data

Apr. 27, 1983 [JP] Japan .................... 58-74500

[51] Int. Cl.$^3$ .................... C08K 7/22; C08K 7/26; C08K 7/28; C08K 5/04
[52] U.S. Cl. .................... 523/219; 523/438; 523/443; 523/444; 523/445; 523/449; 523/451; 523/455; 524/25; 524/109; 524/143; 524/295; 524/296; 524/297; 524/314; 524/404; 524/444; 524/493; 524/558
[58] Field of Search ............... 523/219, 449, 443, 444, 523/438, 451, 455, 445; 524/25, 109, 143, 295, 296, 297, 314, 558

[56] References Cited

U.S. PATENT DOCUMENTS 4,388,424 6/1983 Kennel et al. .................... 524/561

4,391,944 7/1983 Yamane et al. .................... 524/314

FOREIGN PATENT DOCUMENTS 0667418 12/1982 European Pat. Off. .
100153 6/1982 Japan .................... 524/558
57-19576 12/1982 Japan .................... 523/219

OTHER PUBLICATIONS

Chem Abs., 98-180382(f) (1983) Chisso Corp., Japanesse JP57-192412.

Primary Examiner—Herbert J. Lilling
Attorney, Agent, or Firm—Fred Philpitt

[57] ABSTRACT

A soft vinyl chloride resin composition having a light weight and a superior abrasion resistance and lusterless surface is provided, which composition is obtained by blending 100 parts by weight of a vinyl chloride copolymer consisting of 99.0 to 99.95% by weight of vinyl chloride and 1.0 to 0.05% by weight of a polyethylene glycol diacrylate or a polyethylene glycol dimethacrylate both having 4 to 50 polymerization units of ethylene glycol, mainly with (a) 5 to 100 parts by weight of a filler having a specific gravity of 0.7 or less and a compressive strength of 70 Kg/cm$^2$ or higher and (b) 30 to 150 parts by weight of a plasticizer.

4 Claims, No Drawings

SOFT VINYL CHLORIDE RESIN COMPOSITION

BACKGROUND OF THE INVENTION

This invention relates to a light-weight, lustless surface, abrasion resistant, soft vinyl chloride resin composition.

Soft vinyl chloride resins are superior in physical and chemical properties, readily processable and relatively cheap. Thus they have been broadly used for sundries of daily use, automobile components, etc. in the form of various molded products and further leather, sheet, etc. However, the specific gravities of soft vinyl chloride resins are in the range of 1.2 to 1.5, that is, when compared with other general-purpose resins, they are as high as 1.3 to 1.6 times those of polypropylene or 2 to 2.5 times those of foamed polyurethane of RIM process. This has come to be regarded as a serious defect in the application field of automobile parts where it has been aimed to make the components light-weight for energy saving.

As for processes for making soft vinyl chloride resins light-weight, a foaming process using chemical foaming agents has been generally employed, but this process has various drawbacks in productivity and economy such that the molding cycle is long; the ranges of processing conditions are narrow; foams are readily broken; the product yield is inferior; it is impossible to regenerate and reuse waste articles; etc.

As for other processes for making soft vinyl chloride resins light-weight, a process of blending microballoons such as glass balloon as a filler is known. However, such a filler is intrinsically deficient in adhesion to vinyl chloride resins; molded products obtained by using resins having such a filler blended therein are reduced in mechanical strengths or the filler is readily peeled off from the surface of molded products during their use, to make the abrasion resistance inferior; thus in order to be freed of such defects, it becomes necessary to simultaneously use a coupling agent such as silane compounds; hence various problems have been raised in operability and economy.

On the other hand, in the application field of automobile parts, molded products having a lusterless surface have come to be desired. As for processes for producing lusterless molded products, there have been proposed (1) a process of applying a lusterless paint onto the surface of molded products; (2) a process of providing uneven surface for molded products by means of a metal mold or roll having projections and depressions on its surface; (3) process of blending a high molecular weight luster-preventing agent such as cross-linked acrylic resins; (4) a process of using a vinyl chloride resin having a high average degree of polymerization; (5) a process of blending an inorganic filler such as calcium carbonate; etc., but any of these processes have the following drawbacks and are unsatisfactory:

According to the process (1) or (2), the lusterless state of surface is easily lost by abrasion. According to the process (3), the effect to prevent luster is small, and if the agent is blended in a large amount, uneven luster is formed on the surface of molded products. According to the process (5), a luster preventing effect is exhibited, but the specific gravity increases and the mechanical properties, particularly the abrasion resistance, are much reduced and further the surface is liable to be injured. It may be considered to simultaneously employ the processes (1) and (2), that is, to overlay a lusterless paint upon an embossed surface, to thereby cause the resulting surface to retain the lusterless state for a long time, but the cost increases due to increase in processing steps; hence such process is not practical.

In order to solve the above problems directed to soft vinyl chloride resins, the present inventors have made extensive research, and as a result, have found that when a specified filler and a plasticizer are blended with a specified vinyl chloride copolymer, the resulting soft vinyl chloride resin composition has a light-weight, can retain a lusterless state for a long term, and has a superior abrasion resistance.

SUMMARY OF THE INVENTION

The present invention resides in a soft vinyl chloride resin composition having a light weight and a superior abrasion resistance and lusterless surface, which composition is obtained by blending 100 parts by weight of a vinyl chloride copolymer consisting of 99.0 to 99.95% by weight of vinyl chloride and 1.0 to 0.05% by weight of a polyethylene glycol diacrylate or a polyethylene glycol dimethacrylate both having 4 to 50 polymerization units of ethylene glycol, mainly with (a) 5 to 100 parts by weight of a filler having a specific gravity of 0.7 or less, a particle diameter of 300 microns or less and a compressive strength of 70 Kg/cm$^2$ or higher and (b) 30 to 150 parts by weight of a plasticizer.

DETAILED DESCRIPTION OF THE PREFERRED EMBODIMENTS

The vinyl chloride copolymer used in the composition of the present invention is a copolymer of vinyl chloride monomer (hereinafter abbreviated to VCMR) with a specified polyethylene glycol diacrylate or a specified polyethylene glycol dimethacrylate. The content of the vinyl chloride part in this copolymer is 99.0 to 99.95% by weight, as described above, but so long as the object of the present invention is not obstructed, it is possible to replace a portion of the vinyl chloride part by other vinyl monomers as described later. In this case, it is necessary that vinyl chloride in the vinyl chloride part remain in an amount of 50% by weight or more, preferably 70% by weight or more, based on the total weight of the copolymer, and its upper limit is the above-mentioned 99.95% by weight. Examples of other vinyl monomers capable of being substituted for vinyl chloride are vinylidene chloride, vinyl acetate, methyl vinyl ether, ethylene, propylene, etc.

Next, the above specified polyethylene glycol diacrylate (hereinafter abbreviated to PEGA) or specified polyethylene glycol dimethacrylate (hereinafter abbreviated to PEGM) refers both to those having 4 to 50 repetition units (n) of ethylene glycol group in the polyethylene glycol part, and it is possible to simultaneously use PEGA and PEGM or similarly use polyethylene glycol acrylate methacrylate as the corresponding mixed ester. In PEGA or PEGM, if the number of repetition units (n) of ethylene glycol group is less than 4, molded products obtained by using the composition of the present invention are insufficient in the luster preventing effect, and if the number exceeds 50, efficient copolymerization is difficult and unpolymerized PEGA or PEGM blooms out to the surface of molded products as final products.

The content of PEGA or/and PEGM in the copolymer used for the composition of the present invention is in the range of 1.0 to 0.05% by weight. Even if the content exceeds 1.0% by weight, there is no particular improvement in the lusterless properties, and in the case of the copolymer having such a high content thereof, unpolymerized PEGA or PEGM is liable to remain in the copolymer. Further, if the content is less than 0.05% by weight, the luster preventing effect is insufficient.

The vinyl chloride copolymer used for the composition of the present invention is obtained by polymerizing VCMR and PEGA or PEGM in a definite ratio by weight according to a heretofore known process for polymerizing vinyl chloride. Namely any of bulk polymerization, suspension polymerization, emulsion polymerization and solution polymerization may be employed. Among them, however, suspension polymerization is preferable in that it is superior in the reproducibility of polymerization degree, conversion, etc., and easy in the process control. The average degree of polymerization of the resulting copolymer has no particular limitation, but it is preferably in the range of 400 to 3,000.

The filler used in the composition of the present invention has a specific gravity of 0.7 or less, a particle diameter of 300 microns or less and a compressive strength of 70 Kg/cm$^2$ or higher. If the specific gravity exceeds 0.7, the filler does not contribute so much to making the composition of the present invention light-weight, and if it is added in a large amount in order to make the composition light-weight, the mechanical strength of the resulting molded products is reduced. If the particle diameter exceeds 300 microns, clogging occurs in the strainer of molding machine or particles are raised onto the surface of molded products to damage their appearance. Further, if the compressive strength is lower than 70 Kg/cm$^2$, breakage of particles occurs within the molding machine to reduce the effect of making the composition light-weight.

Examples of the filler usable in the composition of the present invention are microballoons made from aluminosilicate, borosilicate glass, silica, fly ash, epoxy resins, etc. as stocks.

The amount of the filler blended is in the range of 5 to 100 parts by weight based on 100 parts by weight of the vinyl chloride copolymer, but this range varies depending on the amount of the plasticizer blended, as described below. Namely (1) if the amount of the plasticizer is in the range of 30 to 60 parts by weight, the amount of the filler is preferably in the range of 5 to 60 parts by weight, and (2) if the amount of the plasticizer is in the range of 60 to 150 parts by weight, the amount of the filler is preferably in the range of 5 to 100 parts by weight. In the above case (1), if the amount of the filler added exceeds 60 parts by weight, the viscosity of the resulting composition increases and surface roughening occurs on the surface of molded products or breakage of filler particles occurs at the time of kneading. In the above case (2), even if the amount of the filler blended exceeds 100 parts by weight, contribution of the filler to making the composition light-weight is relatively small, and drawbacks such as reduction in the processability or reduction in the strength of molded products become notable.

In the composition of the present invention, the plasticizer is blended in an amount of 30 to 150 parts by weight based on 100 parts by weight of the vinyl chloride copolymer. The kind of the plasticizer used has no particular limitation and known plasticizers may be used alone or in admixture. Examples of such plasticizers are those of phthalic esters such as dioctyl phthalate, those of adipic esters such as dioctyl adipate, those of phosphoric esters such as tricresyl phosphate, those of polyesters such as 1,3-butylene glycol adipate, those of trimellitic esters such as tributyl trimellitate, those of epoxy plasticizers such as epoxidized soybean oil, etc. If the amount of the plasticizer blended is less than 30 parts by weight, the resulting molded products are hard, and if it exceeds 150 parts by weight, the plasticizer exudates onto the surface of molded products.

In the composition of the present invention, a known stabilizer is blended in a suitable amount as in the case of conventional vinyl chloride resin composition. Examples of such stabilizer are metal soaps such as zinc stearate, stabilizers of organotin group such as dibutyltin dilaurate, stabilizers of lead group such as tribasic lead sulfate, etc. These stabilizers may be used alone or in admixture of two or more kinds thereof, and their amount used is usually in the range of 0.5 to 5 parts by weight. In the composition of the present invention, as far as the object of the present invention is not obstructed, it is possible to blend ultraviolet absorber, pigment, lubricant, processing agent or the like.

The above-mentioned vinyl chloride copolymer, filler, plasticizer, stabilizer and other additives are blended to give the soft vinyl chloride resin composition of the present invention. The blending manner has no particular limitation. Any of known apparatus such as ribbon blender, V type blender, tumbler mixer, Henschel mixer ®, etc. may be used, and it is also possible to carry out granulation by means of a monoaxial or biaxial extruder.

The composition of the present invention thus obtained can be molded into various soft molded products by way of known processing method such as calendering, injection molding, extrusion molding, blow molding, etc. The resulting molded products have a low specific gravity, exhibit a homogeneously lusterless surface and also have a superior abrasion resistance.

The present invention will be concretely described by way of Examples and Comparative examples. The methods for measuring physical properties employed in these examples and the properties of the filler are as follows:

(1) Specific gravity: according to ASTM D792.
(2) Lusterless state of the surface:
  (i) judgement by visual observation—lusterless properties were designated by the following symbols: o (good), Δ (somewhat good), × (bad);
  (ii) measurement of gloss—according to JIS Z8741, light angle 60°.
(3) Abrasion resistance: according to JIS K7204, load 1 Kg, 1,000 revolutions, abrasion wheel (H-22, manufactured by Taber Co.).
  Filler A: aluminosilicate microballoon, specific gravity 0.7, average particle diameter 130 microns, compressive strength 70 Kg/cm$^2$.
  Filler B: aluminosilicate microballoon, specific gravity 0.7, average particle diameter 30 microns, compressive strength 70 Kg/cm$^2$.
  Filler C: aluminosilicate microballoon, specific gravity 0.6, average particle diameter 150 microns, compressive strength 20 Kg/cm$^2$.
  Filler D: aluminosilicate microballoon, specific gravity 0.7, average particle diameter 450 microns, compressive strength 70 Kg/cm$^2$.
  Filler E: aluminosilicate microballoon, specific gravity 0.7, average particle diameter 70 microns, compressive strength 70 Kg/cm$^2$.

Filler F: borosilicate glass microballoon, specific gravity 0.35, average particle diameter 150 microns, compressive strength 90 Kg/cm$^2$.

mm × 100 mm × 3 mm) obtained by molding the above belt form sample according to hot press method. The results are shown in Table 1.

TABLE 1

|  |  | Example 1 | Example 2 | Com. par. ex. 1 | Com. par. ex. 2 | Com. par. ex. 3 | Com. par. ex. 4 | Com. par. ex. 5 | Example 3 | Com. par. ex. 6 | Com. par. ex. 7 | Com. par. ex. 8 | Com. par. ex. 9 |
|---|---|---|---|---|---|---|---|---|---|---|---|---|---|
| Blending formulation (part by weight) | Vinyl chloride copolymer | 100 | 100 | 100 | 100 | 100 | 100 | 100*1 | 100 | 100 | 100 | 100 | 100*1 |
| | Plasticizer (C-81)*2 | 100 | 100 | 100 | 100 | 100 | 100 | 100 | — | — | — | — | — |
| | Plasticizer (DOP) | — | — | — | — | — | — | — | 40 | 40 | 40 | 40 | 40 |
| | Filler A | 25 | — | — | — | — | — | — | — | — | — | — | — |
| | Filler B | — | 25 | — | — | — | — | — | — | — | — | — | — |
| | Filler C | — | — | 25 | — | — | — | — | — | — | — | — | — |
| | Filler D | — | — | — | 25 | — | — | — | — | — | — | — | — |
| | Filler E | — | — | — | — | — | — | — | 45 | 80 | — | — | 45 |
| | Ba—Zn stabilizer | 2.5 | 2.5 | 2.5 | 2.5 | 2.5 | 2.5 | 2.5 | 2 | 2 | 2 | 2 | 2 |
| | Epoxidized soybean oil | 3 | 3 | 3 | 3 | 3 | 3 | 3 | 3 | 3 | 3 | 3 | 3 |
| | Processing agent*3 | 3 | 3 | 3 | 3 | 3 | 3 | 3 | 5 | 5 | 5 | 5 | 5 |
| | Carbon black | 2 | 2 | 2 | 2 | 2 | 2 | 2 | 5 | 5 | 5 | 2 | 5 |
| | Foaming agent*4 | — | — | — | — | — | 0.7 | — | — | — | — | 1.0 | — |
| Evaluation physical properties | Specific gravity | 1.09 | 1.04 | 1.19 | 1.18 | 1.19 | 1.05 | 1.08 | 1.10 | 1.27 | 1.25 | 0.95 | 1.10 |
| | Lusterless Visual judgement state | o | o | o | o*5 | o | o*6 | x | o | o*5 | o | o*5 | x |
| | Gloss (%) | 19 | 18 | 19 | 20 | 25 | 20~35 | 55 | 6.5 | 3.8 | 7 | 10 | 35 |
| | Abrasion resistance (mg) | 325 | 320 | 331 | 356 | 314 | 437 | 528 | 328 | 397 | 310 | 487 | 563 |

*1Vinyl chloride homopolymer ($\bar{P}$ = 1,300)
*2Linear chain alcohol phthalate (Chissocizer-C-81 made by Chisso Corporation)
*3Acrylic resin (Methaprene P-551 made by Mitsubishi Rayon Co.)
*4Azodicarbonamide
*5Surface roughening, remarkable
*6Uneven foaming on surface Examples 1 and 2 and Comparative Examples 1~5

A monomer mixture consisting of 1.0% by weight of a polyethylene glycol diacrylate (n=14) and 99.0% by weight of vinyl chloride was subjected to suspension polymerization at 52° C. to obtain a vinyl chloride copolymer having an average degree of polymerization (hereinafter abbreviated to $\bar{P}$) of 1,300. With this copolymer were blended various fillers, plasticizers, stabilizers and other additives according to blending formulations shown in Table 1, followed by blending them at a highest temperature of 130° C. for 20 minutes by means of Henschel mixer ® and then pelletizing the resulting blend according to cold cut method by means of a monoaxial extruder having a screw diameter of 65 mm to obtain various soft vinyl chloride resin compositions. A vinyl chloride homopolymer ($\bar{P}$=1,300) in place of the vinyl chloride copolymer was similarly kneaded and pelletized to obtain a resin composition of Comparative example 5. These compositions were molded into test pieces of 100 mm × 100 mm × 10 mm according to injection molding method, followed by evaluation of physical properties. The results are shown in Table 1.

Example 3 and Comparative examples 6~9

With the copolymer used in Example 1 were blended filler, plasticizer, stabilizer and other additives according to blending formulations shown in Table 1, followed by blending and pelletizing as in Example 1, to obtain various soft vinyl chloride resin compositions, which were then extrusion-molded into a belt form of 3 mm thick and 20 mm wide by means of a monoaxial extruder having a screw diameter of 40 mm, followed by evaluation of physical properties. A vinyl chloride homopolymer ($\bar{P}$=1,300) was substituted for the vinyl chloride copolymer (Comparative example 9). The abrasion resistance was measured using a test piece (100

Example 4 and Comparative examples 10 and 11

A monomer mixture consisting of 0.50% by weight of a polyethylene glycol dimethacrylate (n=14) and 99.5% by weight of vinyl chloride was subjected to suspension polymerization at 37° C to obtain a vinyl chloride copolymer having an average degree of polymerization ($\bar{P}$) of 2,500, which was then blended and pelletized as in Example 1 to obtain soft vinyl chloride compositions having blending proportions shown in Table 2, which were then molded into test pieces of 100 mm × 100 mm × 10 mm according to injection molding method, respectively, followed by evaluation of physical properties. The results are shown in Table 2. A vinyl chloride homopolymer ($\bar{P}$=2,500) was substituted for the vinyl chloride copolymer (Comparative example 11).

TABLE 2

|  |  | Example 4 | Compar. ex. 10 | Compar. ex. 11 |
|---|---|---|---|---|
| Blending formulation (part by weight) | Vinyl chloride copolymer | 100 | 100 | 100*1 |
| | Plasticizer (C-81)*2 | 100 | 100 | 100 |
| | Filler F | 25 | — | 25 |
| | Ba—Zn stabilizer | 2.5 | 2.5 | 2.5 |
| | Epoxidized soybean oil | 3 | 3 | 3 |
| | Processing agent*3 | 3 | 3 | 3 |
| | Carbon black | 2 | 2 | 2 |
| Evaluation physical properties | Specific gravity | 1.03 | 1.19 | 1.03 |
| | Lusterless Visual judgement state | o | o | x |
| | Gloss (%) | 10 | 13 | 30 |
| | Abrasion resistance (mg) | 318 | 305 | 467 |

*1Vinyl chloride homopolymer ($\bar{P}$ = 2,500)
*2Linear chain alcohol phthalate (Chissocizer-C-81 made by Chisso Corporation)
*3Acrylic resin (Methaprene P-551 made by Mitsubishi Rayon Co.)

As apparent from the data of Examples and Comparative examples, the composition of the present invention is a soft polyvinyl chloride resin composition which is at the same time lusterless and light-weight and also has a superior abrasion resistance without using any coupling agent.

What we claim is:

1. A soft vinyl chloride composition having a light weight, superior abrasion resistance and a lusterless appearance comprising a blend of
   (a) a soft vinyl chloride composition having a light weight, superior abrasion resistance and a lusterless appearance comprising a blend of
      (a) 100 parts by weight of a vinyl chloride copolymer consisting of
         (1) 99.0 to 99.95% by weight of vinyl chloride, and
         (2) 1.0 to 0.5% by weight of a polyethylene glycol diacrylate and/or a polyethylene glycol dimethacrylate, both having 40 to 50 polymerization units of ethylene glycol,
   (b) 5 to 100 parts by weight of a filler having
      (1) a specific gravity of 0.7 or less
      (2) a particle diameter of 300 microns or less, and
      (3) a compression strength of at least 70 Kg/cm$^2$, and
   (c) 30 to 150 parts by weight of a plasticizer.

2. A composition according to claim 1 wherein in component (a)(2) there are 4–50 repetition units of ethylene glycol in polyethylene part.

3. A composition according to claim 1 wherein the filler comprises microballoons made from aluminsilicate or borosilicate glass, or silica, or fly ash, or epoxy resins.

4. A composition according to claim 1 wherein said plasticizer is dioctyl phthalate, or dioctyl adipate, or tricresyl phosphate or 1, 3-butylene glycol adipate or tributyl trimellitate or epoxidized soybean oil.

* * * * *

UNITED STATES PATENT AND TRADEMARK OFFICE
CERTIFICATE OF CORRECTION

PATENT NO. : 4,528,306
DATED : July 9, 1985
INVENTOR(S) : KOGA et al

It is certified that error appears in the above—identified patent and that said Letters Patent is hereby corrected as shown below:

On the title page, Item /75/, should read

[75] Inventors: SHIGEHIRO KOGA, YOSHIHISA KANAZAWA, TAKESHI OKAMOTO, MASAFUMI YAMANOUCHI and KAZUMICHI SHUDO , all of Ichiharashi, Japan --.

Item /19/, "Shigehiro et al" should read

-- Koga et al. --.

Signed and Sealed this

Tenth Day of December 1985

[SEAL]

Attest:

Attesting Officer

DONALD J. QUIGG

Commissioner of Patents and Trademarks